Sept. 1, 1970 T. O. PAINE, DEPUTY 3,526,365
ADMINISTRATOR OF THE NATIONAL AERONAUTICS
AND SPACE ADMINISTRATION
COLLAPSIBLE NOZZLE EXTENSION FOR ROCKET ENGINES
Filed May 21, 1968 4 Sheets-Sheet 1

WARREN E. DARROW, JR.
BILLY C. URSERY
INVENTORS

BY
ATTORNEYS

Sept. 1, 1970 T. O. PAINE, DEPUTY 3,526,365
ADMINISTRATOR OF THE NATIONAL AERONAUTICS
AND SPACE ADMINISTRATION
COLLAPSIBLE NOZZLE EXTENSION FOR ROCKET ENGINES
Filed May 21, 1968 4 Sheets-Sheet 2

WARREN E. DARROW, JR.
BILLY C. URSERY
    INVENTORS

BY
    ATTORNEYS

Sept. 1, 1970     T. O. PAINE, DEPUTY     3,526,365
ADMINISTRATOR OF THE NATIONAL AERONAUTICS
AND SPACE ADMINISTRATION
COLLAPSIBLE NOZZLE EXTENSION FOR ROCKET ENGINES
Filed May 21, 1968                                       4 Sheets-Sheet 3

WARREN E. DARROW, JR.
BILLY C. URSERY
*INVENTORS*

BY
*ATTORNEYS*

WARREN E. DARROW, JR
BILLY C. URSERY
INVENTORS

United States Patent Office 3,526,365
Patented Sept. 1, 1970

3,526,365
COLLAPSIBLE NOZZLE EXTENSION FOR
ROCKET ENGINES
T. O. Paine, Deputy Administrator of the National Aeronautics and Space Administration, with respect to an invention of Warren E. Darrow, Jr., Huntsville, Ala., and Billy C. Ursery, Guntersville, Ala.
Filed May 21, 1968, Ser. No. 730,733
Int. Cl. B64c 15/06
U.S. Cl. 239—265.43
5 Claims

ABSTRACT OF THE DISCLOSURE

A collapsible nozzle extension for a rocket engine comprising a set of conical extension sections that are telescoped in the collapsed position and mate end to end in the extended position. The conical sections and existing engine nozzle are interconnected by a plurality of folding and extending linkage arms, each comprising a series of pivotally connected links, circumferentially spaced around the nozzle. The links incorporate springs that urge the folded linkage arms and thus the conical extension sections toward the extended position, and the arms are latched in the folded position by a mechanism that releases the arms for nozzle extension.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates generally to rocket engines and more particularly to a collapsible nozzle extension for rocket engines that can be deployed in a zero gravity environment at the desired instant, such as immediately after a rocket stage separation.

Currently, an important aspect of space vehicle development is that of uprating existing vehicles for the purpose of increasing their payload capability so that payload requirements expected in the early 1970's may be satisfied. This vehicle uprating requires an increase of the thrust capability of the vehicle engine systems. One way of increasing the performance of a rocket engine having an underexpanded nozzle is to increase the area ratio of the engine nozzle throat with respect to the engine nozzle exit area. This is accomplished by extension of the nozzle to a pre-determined increased in exit area.

Certain stages of existing space vehicles are powered by engines that have a highly underexpanded nozzle, and an extension of the existing nozzle to a larger area ratio will increase the thrust capability of the particular engines. However, if the existing nozzle structure of an engine is simply extended to produce a larger area ratio, the extension in some instances would interfere with components, such as propellant tanks, of the adjoining stage of the space vehicle. Thus, what is required is a collapsible nozzle extension that can be stowed in a compact arrangement and deployed after adjoining stage separation, which means that the extension must be deployable under low of zero gravity conditions.

SUMMARY OF THE INVENTION

The invention comprises a set of telescoping conical sections that are interconnected to each other and to the exit end of the existing engine nozzle by a plurality of folding and extending circumferentially spaced linkage arms. In the stowed position the conical sections are telescopically arranged concentrically around the exit end of the nozzle, and in the extended position the sections mate end to end. Each of the linkage arms is secured to the existing engine nozzle and may be latched in the folded position, being urged toward the extended position by springs incorporated in the links. The linkage arms are released by the latch mechanism when nozzle extension is desired and the spring-urged linkage arms force the extension of the conical sections in a weightless environment. When the conical sections are extended the linkage arms automatically lock in the extended position thus rigidifying the nozzle extension.

Accordingly, it is a general object of the present invention to provide an improved collapsible nozzle extension for rocket engines.

A more specific object of the invention is to provide a nozzle extension system that may be stowed in a compact arrangement and extended to effect the nozzle extension at the exact time required.

Another object of the invention is to provide an extension system for a rocket engine nozzle that will operate under zero gravity conditions without the necessity for complex and heavy actuating equipment such as electric motors, gears and guide tracks for forcing the extending parts into place.

Another object of the invention is to provide a collapsible nozzle extension that will automatically lock and rigidify in the extended position after extension has been accomplished.

These and other objects and advantages of the invention will become apparent upon reference to the following specification, attendant claims and drawing.

DESCRIPTION OF THE PREFERRED EMBODIMENT

Figure 1:
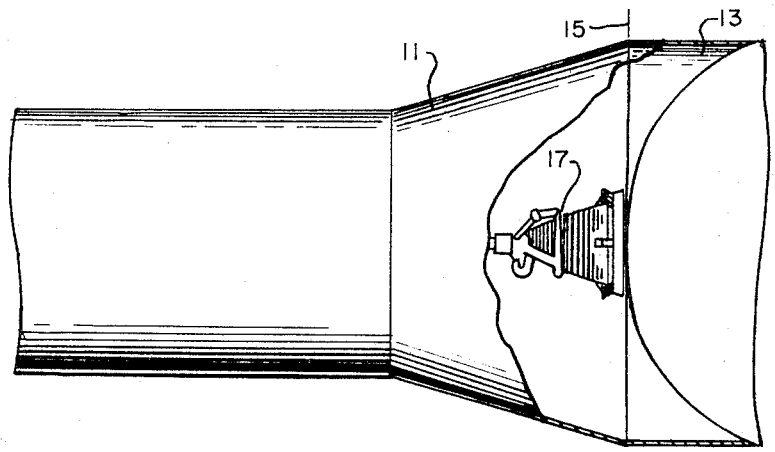
FIG. 1 is an elevational view of adjoining stages of a space vehicle, partially broken away to show a rocket engine of one stage equipped with a collapsible nozzle extension in the stowed position.

Referring to FIG. 1, therein is shown adjoining stages 11 and 13 of a space vehicle with stages meeting along a separation line 15. The stage 11 is powered by a rocket engine 17 which is equipped with a collapsible nozzle extension system to be deployed immediately following separation of the stages 11 and 13. As indicated previously, it is necessary to employ a collapsible nozzle extension system that can be deployed after stage separation, since the nozzle would interfere with components of the stage 13, such as its propellant tank, if the existing nozzle of the engine 17 were merely lengthened with a noncollapsible extension. Moreover, since stage separation may occur in low or zero gravity conditions, it is required that the nozzle extension system on the engine 17 be deployable under such conditions.

Figure 2:
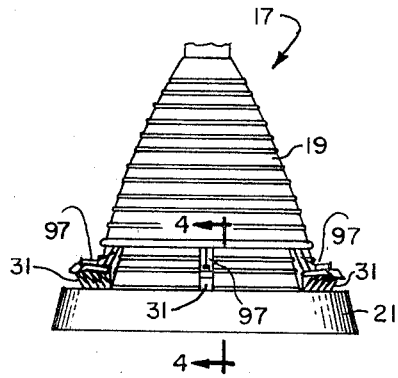
FIG. 2 is an elevational view of a rocket engine nozzle such as shown in FIG. 1 equipped with the nozzle extension system of the present invention, the extension being in the collapsed position.
Figure 3:
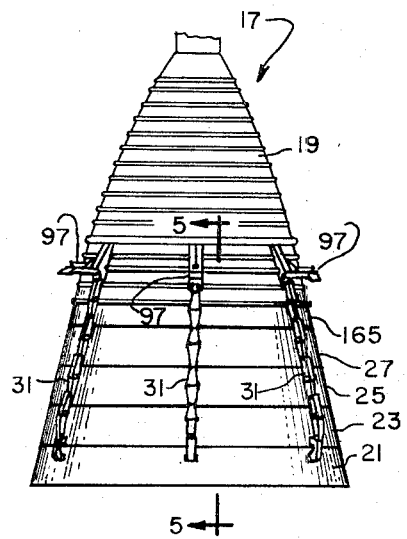
FIG. 3 is an elevational view of the rocket engine nozzle of FIG. 2 showing the nozzle extension in the extended position.
Figure 4:
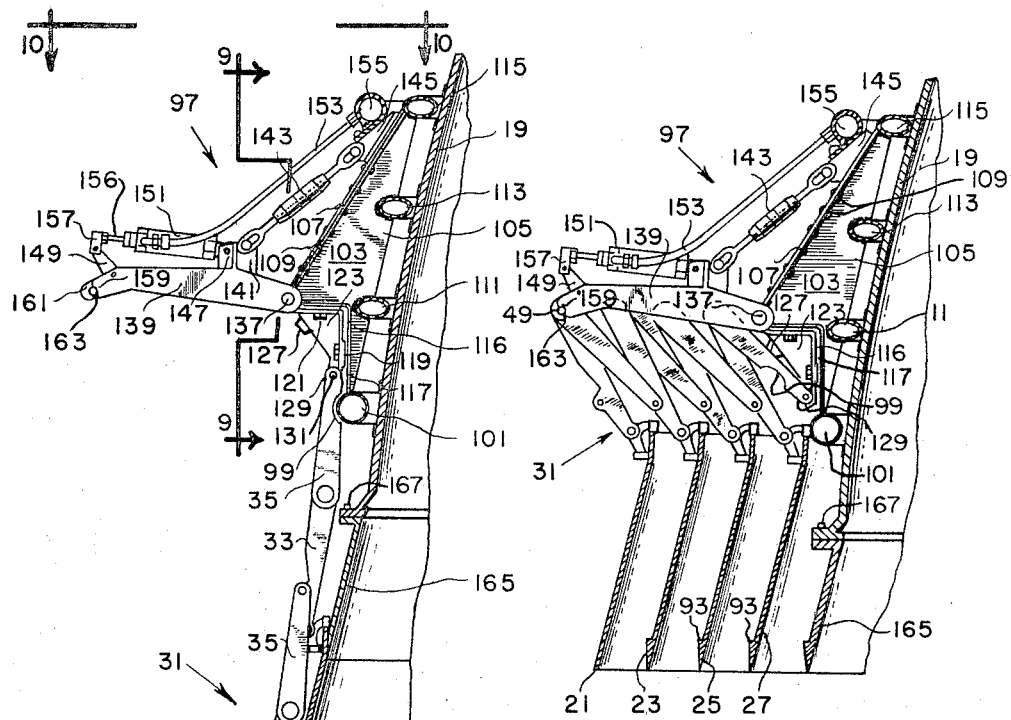
FIG. 4 is an enlarged cross-sectional view of the engine nozzle of FIG. 2 taken along line 4—4 of FIG. 2.
Figure 5:
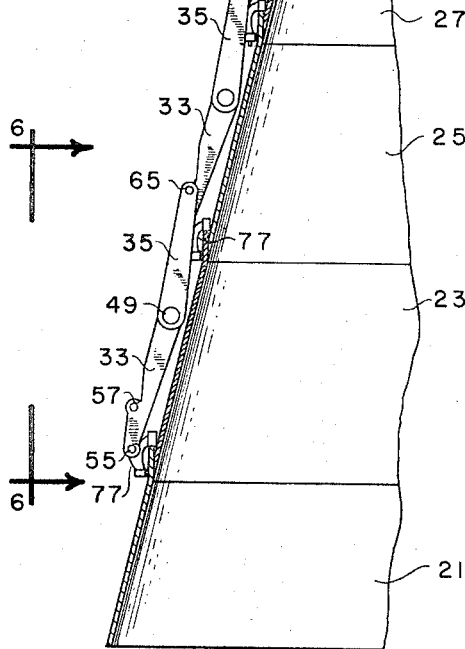
FIG. 5 is an enlarged cross-sectional view of the engine nozzle of FIG. 3 taken along line 5—5 of FIG. 3.

In FIG. 2 a nozzle 19 of the rocket engine 17 is shown with the extensible nozzle system in the collapsed or stowed position. As shown in FIG. 4, the extensible system includes a series of conical metallic sections 21, 23, 25 and 27 concentrically arranged around the exit end of the nozzle 19 with each section diverging in diameter from its upper or forward end to its lower or trailing end. The respective sections gradually decrease in diameter so that they will telescope into a compact arrangement. The sections are interconnected, supported and shifted from the collapsed to the extended position by a plurality of linkage arms 31 circumferentially spaced equally around the lower end of the nozzle 19. The embodiment illustrated in FIGS. 2 and 3 utilizes six linakge arms 31 spaced at 60 degree intervals. In FIGS. 3 and 5 the conical sections 21, 23, 25 and 27 are shown extended with the linkage arms 31 supporting them and rigidifying them in the extended position.

Figure 6:
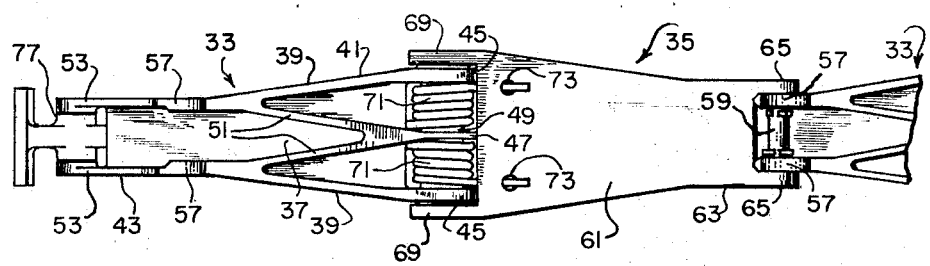
FIG. 6 is a view of the outer side of a pair of links taken along line 6—6 of FIG. 5.
Figure 7:
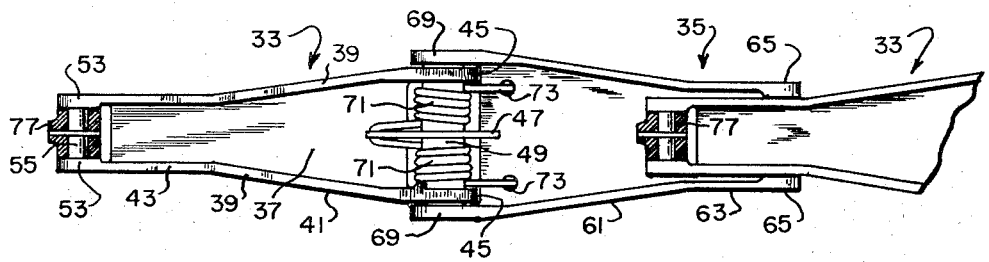
FIG. 7 is a view of the under side of the pair of links shown in FIG. 6.
Figure 8:
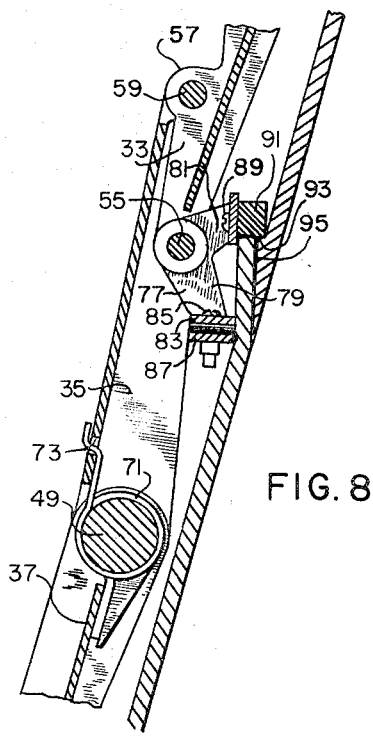
FIG. 8 is an enlarged cross sectional view showing the mating ends of two conical extension sections and the connection between a conical section and one of the links of FIGS. 6 and 7.

Each of the linkage arms 31 comprises a series of pivotally connected links 33 and 35 (see FIGS. 5, 6 and 7). Each of the links 33 has a web portion 37 extending between flanges 39 with a diverging length 41 merging with a portion 43 having parallel edges. At the diverging end of the links 33 are a pair of lugs 45 and a center lug 47 having aligned holes therein to receive a pivot pin 49. The outer side (FIG. 6) of the links 33 has two converging ribs 51 that merge into the center lug 47. The opposite end of each link 33 has two projecting lugs 53 having aligned holes to receive a pivot pin 55 (FIG. 7) and projecting from the outer side of the links as an integral part of the side flanges 39 are two further lugs 57 also having aligned holes to receive a pivot pin 59 (FIGS. 5, 6 and 8).

The second link 35 is channel shaped having a diverging portion 61 and a straight-edge portion 63 at the end of which are a pair of lugs 65 having aligned holes to receive the pivot pin 59. As seen from FIGS. 5, 6 and 7, the lugs 65 of the link 35 receive the lugs 57 of the link 33 with these lugs being pivotally connected by the pivot pin 59. Likewise, the diverging ends of the links 33 and 35 mate with the lugs 45 and 47 of the links 33 fitting between a pair of lugs 69 of the links 35. These lugs are pivotally connected by the pivot pin 49 and this pivot joint is spring biased by a pair of springs 71 arranged on the pivot pin 49.

The spring 71 are mounted on each side of the center lug 47 of the link 33 and one end of each spring 71 passes through an aperture 73 on each side of the web portion of the link 35. The opposite end of each of the springs 71 is directed parallel with the web portion 37 of the link 33 and bears against the inner surface of the web portion 37 strongly biasing the links 33 and 35, and thus the entire linkage arm 31, toward the extended or unfolded position shown in FIGS. 5, 8 and 9.

Thus the several links 33 and 35 are connected in the manner described to form the linkage arms 31. The links 33 are joined respectively to the conical sections 21, 23, 25 and 27 through connectors 77 (see FIG. 8) having angularly related arms 79 and 81 with the end of the arm 79 having a connecting plate 83 joined by screws 85 to a connecting flange 87 welded to the forward end of each of the various conical sections. The other arm 81 of the connectors 79 is joined by screws 89 to a stop element 91 that is welded to the end edge of each conical section. When the conical sections are extended, the stops 91 contact a shoulder surface 93 formed near the lower or trailing end of the conical sections. The forward end of each of the conical sections is slightly diverged so as to mate with a tapered end edge 95 of the respective conical sections.

Each of the linkage arms 31 is supported at its uppermost link by a bracket assembly 97 that also includes a mechanism for latching the linkage arm in the folded position and releasing the linkage arm simultaneously with other linkage arms for extension in response to a signal. The uppermost link of each linkage arm is recessed at 99 to avoid interference with a lower structural ring 101 of the main nozzle 19.

Figure 9:
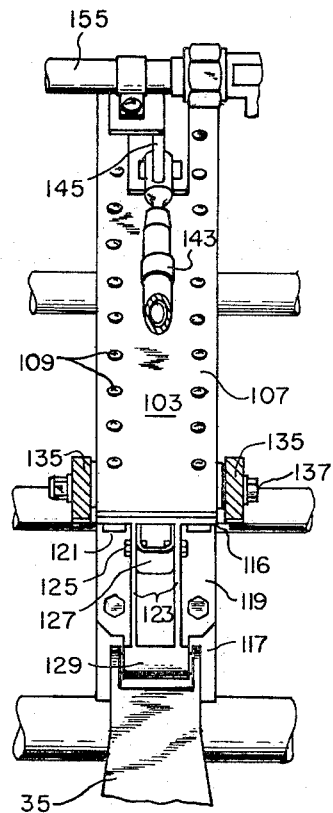
FIG. 9 is a view, partially in cross section, of a bracket assembly taken along line 9—9 of FIG. 5.
Figure 10:
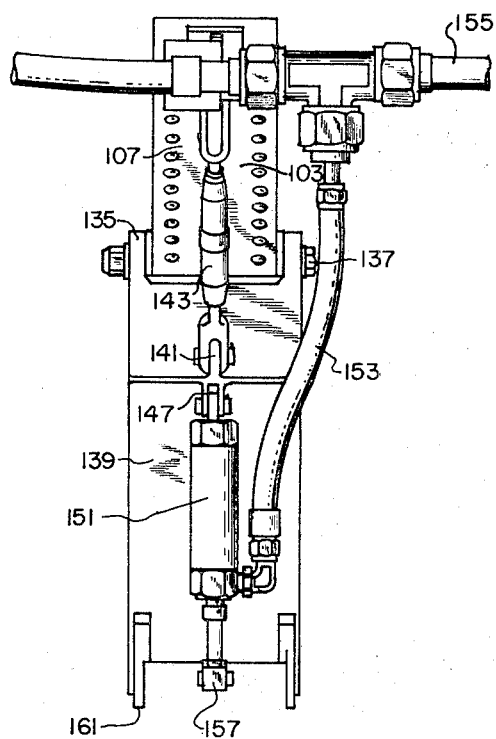
FIG. 10 is another view of the bracket assembly of FIG. 9 taken along line 10—10 of FIG. 5.

Referring to FIGS. 5, 9 and 10, each bracket assembly 97 includes a support structure 103 comprising spaced and opposed vertically tapered angle plates 105 covered by a plate 107 fastened to the angle plates by screws 109. This forms a hollow structure that is joined by welding to structural rings 111, 113 and 115 of the main nozzle 19. A notch 116 is formed in the lower region of the support structure 103. In this notch is installed an angle plate 117, and fitted on the angle plate 117 is an angular connector 119 for receiving the upper end of the uppermost link 35. The plate 117 and the connector 119 are joined to the support 103 by bolts 121. The connector 119 (see FIG. 9) has a pair of triangular shaped ribs 123 formed integrally with the connector and between these ribs 123, secured by bolts 125, is a U-shaped stop element 127 with the web portion thereof inclined to act as a stop for the uppermost link 35 when the linkage arm is in the folded position shown in FIG. 4.

The connector 119 carries a lower lug 129 that has a hole therethrough to match with the holes in the end lugs 65 of the uppermost link 35, being connected by a pivot pin 131 (FIG. 4).

Joined to the support structure 103 near its lower end through connecting lugs 135 and a bolt 137 is a channel-shaped bracket arm 139. On the upper side of the bracket arm is an integral connector 141 receiving an adjustable connecting rod 143 that extends from the connector 141 to a second connector 145 mounted on the upper region of the support structure 103. The function of the connecting rod 143 is to maintain the bracket arm 139 in its horizontal position.

Extending between a connector 147 of the bracket arm 139 and a linkage arm release lever 149 is a pneumatic cylinder 151 that is connected through a tube 153 to an annular air conduit 155. The conduit 155 extends around the nozzle 19 and is supplied by a source of air pressure (not shown). The pneumatic cylinder 151 includes a piston 156 joined to a clevis 157, the latter being connected to the release lever 149.

The outer end of the bracket arm 139 includes a shallow groove 159 that receives the pivot pin 49 located between the end pair of links 33 and 35. A pivoted U-shaped locking and releasing element 161 projects beyond the end of the bracket arm 139 and includes a groove 163 that also engages the endmost pivot pin 49. When the pivot pin 49 is locked at the end of the bracket arm 139 with the entire arm in its folded position the upper portions of the links 33 and 35 partially enter the channel of the bracket arm 139. The several linkage arms are thus held in their retracted position with the springs between the respective linkage elements urging the arms toward the extended position.

When it is desired to deploy the nozzle extension the pneumatic cylinder 151 on each of the support arms 139 is actuated simultaneously to retract the piston 156 and pivot the releasing element 161 to thus release the pin 49 and each of the linkage arms 31 at precisely the same time. When the linkage arms are released the conical sections extend in a step fashion with the outer section 21 becoming fully extended before the next section starts to extend and so on until each of the sections has extended to the position shown in FIGS. 3 and 5. The last section to extend is the smallest element 27 the upper or forward end of which mates with a pre-installed conical transition section 165 that is joined by bolts 167 to the diverging end of the existing nozzle 19.

As indicated in FIG. 5, when the respective linkage arms 31 extend the springs 71 in the joints between the links 33 and 35 force the pivot pins 49 to an overcentered position to produce an overcenter locking of the linkage arms in the extended position. The linkage arms are thus locked in the extended position and the arms become rigid load carrying members rigidifying the extended conical sections and preventing them from retracting. The springs incorporated between the linkage elements 33 and 35 are strong enough to force the conical sections to their extended position under low or zero gravity conditions without any auxiliary power equipment such as motors, gears and guide tracks.

It is understood that various interfitting and sealing configurations and materials may be incorporated at the overlapping end portions of the extended conical sections.

What is claimed is:

1. A collapsible extension for a nozzle of a rocket engine comprising:
   (a) a tubular section arranged concentrically around the exit end of said nozzle and adapted to shift a predetermined distance in a direction rearward of said nozzle;
   (b) said exit end of said nozzle bearing a tubular portion adapted to mate with the forward end of said section when said section is shifted to the extended position;
   (c) means for maintaining a connection between said section and said nozzle when said section is in the collapsed, extended or an intermediate position;
   (d) means for locking said section in the collapsed arrangement and releasing said section for extension;
   (e) means for urging said section to the extended position;
   (f) said connection means comprising a plurality of linkage arms circumferentially spaced around the said nozzle;
   (g) each of said arms comprising a pair of pivotally connected folding and extending links;
   (h) one link of each of said pair of links connected to said section;
   (i) the other link of each of said pair of links connected to said nozzle.

2. The invention as defined in claim 1 wherein said urging means comprises springs incorporated in said pivot connections between said links.

3. The invention as defined in claim 2 wherein said extension incorporates means including said springs for automatically locking said linkage arms in the extended position.

4. The invention as defined in claim 1 wherein said means for locking said section in the collapsed arrangement and releasing said section for extension includes a bracket arm overlying and engaging each of said linkage arms, said releasing means further including an air cylinder associated with each of said bracket arms, each of said air cylinders being connected to a common source of air pressure to effect simultaneous release of each of said linkage arms.

5. A collapsible extension for a nozzle of a rocket engine comprising:
   (a) a plurality of tubular telescoped sections arranged concentrically around the exit end of said nozzle and adapted to shift a predetermined distance in a direction rearward of said nozzle;
   (b) said exit end of said nozzle bearing a tubular portion adapted to mate with the forward end portion of the innermost of said telescoping sections when said section is shifted to the extended position;
   (c) the forward end portion of each of the other of said telescoping sections adapted to mate with the trailing end portion of the next smallest section when said sections are shifted to the extended position;
   (d) means for maintaining an interconnection between said sections and said nozzle when said sections are in the collapsed, extended or an intermediate position;
   (e) means for locking said sections in the collapsed arrangement and for releasing said sections for extension;
   (f) means for urging said sections to the extended position;
   (g) said interconnection means comprising a linkage arm that folds in the collapsed position of said sections and unfolds in the extended position of said sections;
   (h) means including said linkage arm for locking said sections in the extended position.

References Cited
UNITED STATES PATENTS

| | | | |
|---|---|---|---|
| 3,183,664 | 5/1965 | Divone | 239—264.33 |
| 3,270,504 | 9/1966 | Ward | 239—265.33 |
| 3,346,186 | 10/1967 | Fulton et al. | 239—265.43 |

FOREIGN PATENTS

| | | |
|---|---|---|
| 871,403 | 6/1961 | Great Britain. |

LLOYD L. KING, Primary Examiner